United States Patent
Reial et al.

(10) Patent No.: US 10,764,845 B2
(45) Date of Patent: Sep. 1, 2020

(54) RADIO (NR) RANDOM ACCESS RESPONSE (RAR) SYNCHRONIZATION SEQUENCE SELECTION

(71) Applicant: Telefonaktiebolaget LM Ericsson (publ), Stockholm (SE)

(72) Inventors: Andres Reial, Malmö (SE); Johan Axnäs, Solna (SE); Asbjörn Grövlen, Stockholm (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/561,273

(22) PCT Filed: Jul. 24, 2017

(86) PCT No.: PCT/SE2017/050791
§ 371 (c)(1),
(2) Date: Sep. 25, 2017

(87) PCT Pub. No.: WO2018/063050
PCT Pub. Date: Apr. 5, 2018

(65) Prior Publication Data
US 2018/0255521 A1    Sep. 6, 2018

Related U.S. Application Data

(60) Provisional application No. 62/402,891, filed on Sep. 30, 2016.

(51) Int. Cl.
*H04W 56/00* (2009.01)
*H04W 74/08* (2009.01)
(Continued)

(52) U.S. Cl.
CPC ....... *H04W 56/001* (2013.01); *H04J 13/0062* (2013.01); *H04L 5/0048* (2013.01); *H04W 74/0833* (2013.01)

(58) Field of Classification Search
CPC . H04W 56/00; H04W 56/001; H04W 72/042; H04W 72/0413; H04W 72/0453;
(Continued)

(56) References Cited

U.S. PATENT DOCUMENTS

2013/0070726 A1\* 3/2013 Zhang ............... H04W 56/0045
370/331
2013/0329625 A1\* 12/2013 Lee ....................... H04W 74/08
370/312
(Continued)

FOREIGN PATENT DOCUMENTS

WO   2012 144697 A1   10/2012
WO   2015 012654 A1   1/2015

OTHER PUBLICATIONS

PCT Notification of Transmittal of the International Search Report and the Written Opinion of the International Searching Authority, or the Declaration for International application No. PCT/SE2017/050791—dated Sep. 25, 2017.
(Continued)

*Primary Examiner* — Peter Chen
(74) *Attorney, Agent, or Firm* — Baker Botts, LLP

(57) ABSTRACT

According to certain embodiments, a method for use in a network node comprises broadcasting a synchronization signal (SS) to one or more wireless devices. The SS comprises basic information about the network node. The method further comprises receiving a preamble from one of the wireless devices via a random access channel and determining a reference signal (RS) sequence based at least in part on the preamble received via the random access channel and/or the SS that was broadcast to the one or more
(Continued)

wireless devices. The method further comprises transmitting a random access response comprising the RS sequence.

37 Claims, 13 Drawing Sheets

(51) Int. Cl.
*H04J 13/00* (2011.01)
*H04L 5/00* (2006.01)

(58) Field of Classification Search
CPC ......... H04W 72/0446; H04W 72/1278; H04W 72/1289; H04W 74/006; H04W 74/0833; H04W 76/27; H04W 48/10; H04W 72/0833; H04L 5/00; H04L 5/0048; H04L 5/005; H04L 5/0051; H04L 5/0044; H04J 13/0062

See application file for complete search history.

(56) References Cited

U.S. PATENT DOCUMENTS

| | | | |
|---|---|---|---|
| 2014/0376486 A1 | 12/2014 | Lee et al. | |
| 2015/0341974 A1* | 11/2015 | Wu | H04W 8/005 455/11.1 |
| 2018/0054837 A1* | 2/2018 | Islam | H04W 74/0833 |
| 2018/0317261 A1* | 11/2018 | Sung | H04W 74/0833 |

OTHER PUBLICATIONS

3GPP TSG-RAN WG1 #86; Gothenburg, Sweden; Source: Ericsson; Title: On NR Random-Access Response Design (R1-167060)—Aug. 22-26, 2016.

3GPP TSG-RAN WG1 Meeting #86bis; Lisbon, Portugal; Source: Ericsson; Title: NR random-access response design (R1-1609673)—Oct. 10-14, 2016.

* cited by examiner

RADIO (NR) RANDOM ACCESS RESPONSE (RAR) SYNCHRONIZATION SEQUENCE SELECTION

PRIORITY

This nonprovisional application is a U.S. National Stage Filing under 35 U.S.C. § 371 of International Patent Application Serial No. PCT/SE2017/050791 filed Jul. 24, 2017, and entitled "NR RAR Synchronization Sequence Selection" which claims priority to U.S. Provisional Patent Application No. 62/402,891 filed Sep. 30, 2016, both of which are hereby incorporated by reference in their entirety.

TECHNICAL FIELD

Certain embodiments of the present disclosure relate, in general, to wireless communications and, more particularly, to new radio (NR) random access response (RAR) synchronization sequence selection.

BACKGROUND

A random-access (RA) procedure is a key function in a cellular system. For example, in Long Term Evolution (LTE), a user equipment (UE) (which may be referred to interchangeably as a mobile terminal or wireless device) may access the network by participating in a random-access procedure with a transmission and reception point (TRP), such as a base station, access node, or access point. The UE that would like to access the network initiates the random-access procedure by transmitting a preamble (Msg1) in the uplink on the Physical Random-Access Channel (PRACH). The TRP receiving the preamble and detecting the random-access attempt will respond in the downlink by transmitting a random-access response (RAR, Msg2). The RAR carries an uplink scheduling grant for the UE to continue the procedure by transmitting a following subsequent message in the uplink (Msg3) for terminal identification. A similar procedure is envisioned for NR, see an illustration in FIG. 1 (i.e., FIG. 1A-1B).

In LTE, the RAR is transmitted over Physical Downlink Control CHannel (PDCCH)/Physical Downlink Shared Channel (PDSCH), similar to normal data transmission. More specifically, the RAR is sent on the Downlink Shared CHannel (DL-SCH, such as PDSCH) and indicated on the PDCCH using an identity reserved for RAR, the Random Access Radio-Network Temporary Identifier (RA-RNTI) (instead of a Cell Radio-Network Temporary Identifier (C-RNTI) as used for already connected UEs). The RAR message contains, among other items, the detected PRACH preamble index as well as a temporary UE identity, Temporary C-RNTI (TC-RNTI), to be used for further communication between the UE and the network, until a C-RNTI has been assigned to the UE. RAR messages to multiple UEs can be combined into a single transmission over DL-SCH. See e.g., Dahlman et al., "3G evolution: HSPA and LTE for mobile broadband" for more information.

In LTE, the UE receiving the RAR can assume that the RAR is well synchronized with the LTE synchronization signal (called primary synchronization signal (PSS)/secondary synchronization signal (SSS)) and the receiver can hence base its time and frequency synchronization on PSS/SSS and only use the cell-specific reference signals (CRS) in the RAR transmission for the detailed channel estimate (phase estimate), similar to the case of normal data transmission.

In contrast, in NR, a UE might have to be able to receive RAR in a somewhat large timing uncertainty interval relative to the synchronization signal (SS). Reasons for large timing offset between received SS and RAR (using UE perspective) may be e.g., [R1-167060, R1-1609673]:

1. Narrowband and Low Signal-to-Noise Ratio (SNR) for SS
   only enough downlink timing accuracy for small broadcast
   Without beamforming of SS, it might be received with low SNR
2. Different Nodes for SS and RAR
   Propagation: 1 km corresponds to a round trip time of 3.3 µs. This should be compared to a cyclic prefix of approximately 4 µs
3. Non-Synchronized Nodes
   Or "loosely" synchronized nodes
   With SFN (Single Frequency Network) type of SS transmission For these reason, it is proposed to have a self-contained RAR in NR [R1-167060, R1-1609673], i.e., the RAR contains its own dedicated synchronization signal as illustrated in FIG. 2. Each box would typically represent one Orthogonal Frequency Domain Multiplexing (OFDM) symbol (or similar, depending on modulation scheme used), and the dashed boxes are optional symbols if needed to encompass the RAR payload.

If there is only one data signal (DS) symbol (which may often be enough), the synchronization signal reference signal (RS) can likely be used also as a phase reference for channel estimation. If there are multiple DS symbols, there may be a need for additional dedicated reference symbols (DMRS) in the DS part, but those would then typically need to occupy just a subset of the subcarriers.

If the RAR signal, as received at the UE location, is not sufficiently closely aligned with the current downlink (DL) time reference of the UE, the DS field cannot be reliably demodulated and decoded. The aim of the RS field is then to allow establishing an improved time reference, as well as a frequency reference, for placing the fast Fourier transform (FFT) window for DS symbol demodulation. Synchronization search is typically implemented as time-domain correlation of the received sample sequence with reference sequences representing the transmitted RS signal. The reference timing is inferred when a sufficiently high correlation peak is detected. The time-domain correlation is a relatively expensive operation and needs to be carried out individually for each possible RS sequence, so RAR search complexity is proportional to the number of possible RS sequences the UE needs to account for. For the UE, the best configuration is therefore a single RS that applies to any RAR transmission.

The random-access procedure (Msg1-3) employing the RAR design from FIG. 2 is illustrated along with timings in FIG. 3.

SUMMARY

Certain problems can be envisioned if there are several RA attempts almost simultaneously in the network. For example, the network may need to send multiple RARs, from different cells/TRPs and/or to different UEs simultaneously or almost simultaneously. Two problems may then arise. First, a UE may overhear a RAR synchronization sequence sent to another UE, and hence synchronize to the wrong RAR and subsequently attempt decoding of the wrong RAR. Second, if two transmitted RARs arrive at the UE at exactly or approximately the same time, the UE will not be able to distinguish the two (identical) transmitted RAR synchronization signals, and will therefore as channel estimate find the sum of the two channels, which may be completely wrong (e.g., if one channel is 1+j and the other −1−j, then the sum channel is 0), and hence prohibit correct decoding of either RAR DS. These RARs are typically transmitted from different TRPs.

This first issue can be mitigated by requiring the UE to detect multiple synchronization sequence candidates and attempt decoding of each RAR DS (after which, e.g., a Cyclic Redundancy Check, CRC, or some other UE-specific field in the RAR DS will make it clear to the UE whether the RAR was intended for it), but such an approach imposes extra computational complexity on the UE because of the multiple decoding attempts.

The second issue is difficult to mitigate. There is thus a need for a method to ensure detecting multiple RAR signals independent of other RAR signals, in particular the RS fields, in the case they arrive at the UE location simultaneously or in close proximity.

Particular embodiments of the present disclosure may provide solutions to the problems mentioned above. For example, certain embodiments define a set of multiple (many) different possible synchronization sequences in order to ensure separate detection of the RS transmissions. In order to avoid the need for the UE to search for all possible candidate sequences (and subsequently attempt decoding of DS for each found candidate), certain embodiments select the RS sequence to a particular UE based on quantities/information that both the network and the UE know.

In certain embodiments, the sequence is a function of the sequence used for SS that the UE detects, a function of the sequence used for PRACH preamble that the UE transmitted, or a function of both of these quantities. In certain embodiments, the RS sequence is a function of some additional quantity or information X known only by the network.

The disclosure includes a network node, a method for use in a network node, a wireless device, and a method for use in a wireless device, as well as a computer program and a computer program product for performing the disclosed methods.

In certain embodiments, a method for use in a network node comprises broadcasting a synchronization signal (SS) to one or more wireless devices. The SS comprises basic information about the network node. The method further comprises receiving a preamble from one of the wireless devices via a random access channel and determining a reference signal (RS) sequence based at least in part on the preamble received via the random access channel and/or the SS that was broadcast to the one or more wireless devices. The method further comprises transmitting a random access response comprising the RS sequence.

In certain embodiments, a network node comprises one or more interfaces and processing circuitry. The one or more interfaces are operable to broadcast a synchronization signal (SS) to one or more wireless devices. The SS comprises basic information about the network node. The one or more interfaces are further operable to receive a preamble from one of the wireless devices via a random access channel. The processing circuitry is operable to determine a reference signal (RS) sequence based at least in part on the preamble received via the random access channel and/or the SS. The one or more interfaces are further operable to transmit a random access response comprising the RS sequence.

In certain embodiments of the above described method and/or network node, the RS sequence comprises a Zadoff-Chu sequence or a scrambled Zadoff-Chu sequence. In certain embodiments, the RS sequence is determined in part based on some additional quantity X unknown to the wireless device. In certain embodiments, the SS comprises a primary synchronization signal (PSS) and a secondary synchronization signal (SSS), and the RS sequence is based at least in part on the PSS, the SSS, or both. In certain embodiments, the SS comprises a cell identifier (cell ID), and the RS sequence is based at least in part on the cell ID.

In certain embodiments of the above described method and/or network node, the random access channel is a New Radio random access channel (NR-RACH), the preamble received via the random access channel is a NR-RACH preamble, and the RS sequence is based at least in part on the NR-RACH preamble.

In certain embodiments of the above described method and/or network node, the random access response comprises a payload, the payload is fully or partially scrambled using a scrambling sequence, and the scrambling sequence depends on the SS, the preamble, or both.

In certain embodiments of the above described method and/or network node, the SS broadcast comprises transmitting a physical broadcast channel (PBCH) and the PBCH comprises timing information.

In certain embodiments of the above described method and/or network node, the random access response is transmitted using a physical downlink control channel (PDCCH) or a physical downlink shared channel (PDSCH) or both.

In certain embodiments of the above described method and/or network node, the random access response is transmitted using a channel dedicated to random access responses.

In certain embodiments, a method for use in a wireless device comprises receiving a synchronization signal (SS) broadcast from a network node. The SS comprises basic information about the network node. The method further comprises transmitting a preamble to the network node via a random access channel and determining one or more reference signal (RS) sequences based at least in part on the preamble transmitted via the random access channel and/or the SS received from the network node. For each of the determined RS sequences, the method further comprises searching for a random access response comprising the RS sequence.

In certain embodiments, a wireless device comprises one or more interfaces and processing circuitry. The one or more interfaces are operable to receive a synchronization signal (SS) from a network node and transmit a preamble to the network node. The SS signal is broadcast from the network node and comprises basic information about the network node. The preamble is transmitted to the network node via a random access channel. The processing circuitry is operable to determine one or more reference signal (RS) sequences based at least in part on the preamble transmitted via the random access channel and/or the SS received from the network node. The one or more interfaces are further operable to search for a random access response comprising the RS sequence for each of the determined RS sequences.

In certain embodiments of the above described method and/or wireless device, the RS sequence comprises a Zadoff-Chu sequence or a scrambled Zadoff-Chu sequence. In certain embodiments, the RS sequence is determined in part based on some additional quantity X unknown to the wireless device and determining the one or more RS sequences comprises determining an RS sequence for each of the possible configurations of X. In certain embodiments, the SS comprises a primary synchronization signal (PSS) and a secondary synchronization signal (SSS), and the RS sequence is based at least in part on the PSS, the SSS, or both. In certain embodiments, the SS comprises a cell identifier (cell ID), and the RS sequence is based at least in part on the cell ID.

In certain embodiments of the above described method and/or wireless device, the random access channel is a New Radio random access channel (NR-RACH), the preamble transmitted via the random access channel is a NR-RACH preamble, and the RS sequence is based at least in part on the NR-RACH preamble.

In certain embodiments of the above described method and/or wireless device, the random access response comprises a payload, the payload is fully or partially scrambled using a scrambling sequence, and the scrambling sequence depends on the SS, the preamble, or both.

In certain embodiments of the above described method and/or wireless device, the SS comprises a physical broadcast channel (PBCH) and the PBCH comprises timing information.

In certain embodiments of the above described method and/or wireless device, the random access response is received using a physical downlink control channel (PDCCH) or a physical downlink shared channel (PDSCH) or both.

In certain embodiments of the above described method and/or wireless device, the random access response is received using a channel dedicated to random access responses.

In certain embodiments, a computer program comprises computer-readable instructions for causing processing circuitry to perform any of the methods described herein as being performed by a network node or a wireless device. In certain embodiments, a computer program product comprises a computer-readable medium storing such a computer program.

Certain embodiments may provide one or more technical advantages. As an example, certain embodiments substantially reduce the risk that the UE fails to detect and decode a self-contained RAR in NR. As another example, in embodiments where the number of RS fields the UE needs to search for remains equal to one, the proposed solution requires no extra UE computational complexity. Certain embodiments may include all, some, or none of these advantages. Other advantages will be apparent to persons of ordinary skill in the art.

DETAILED DESCRIPTION

Figure 1A:
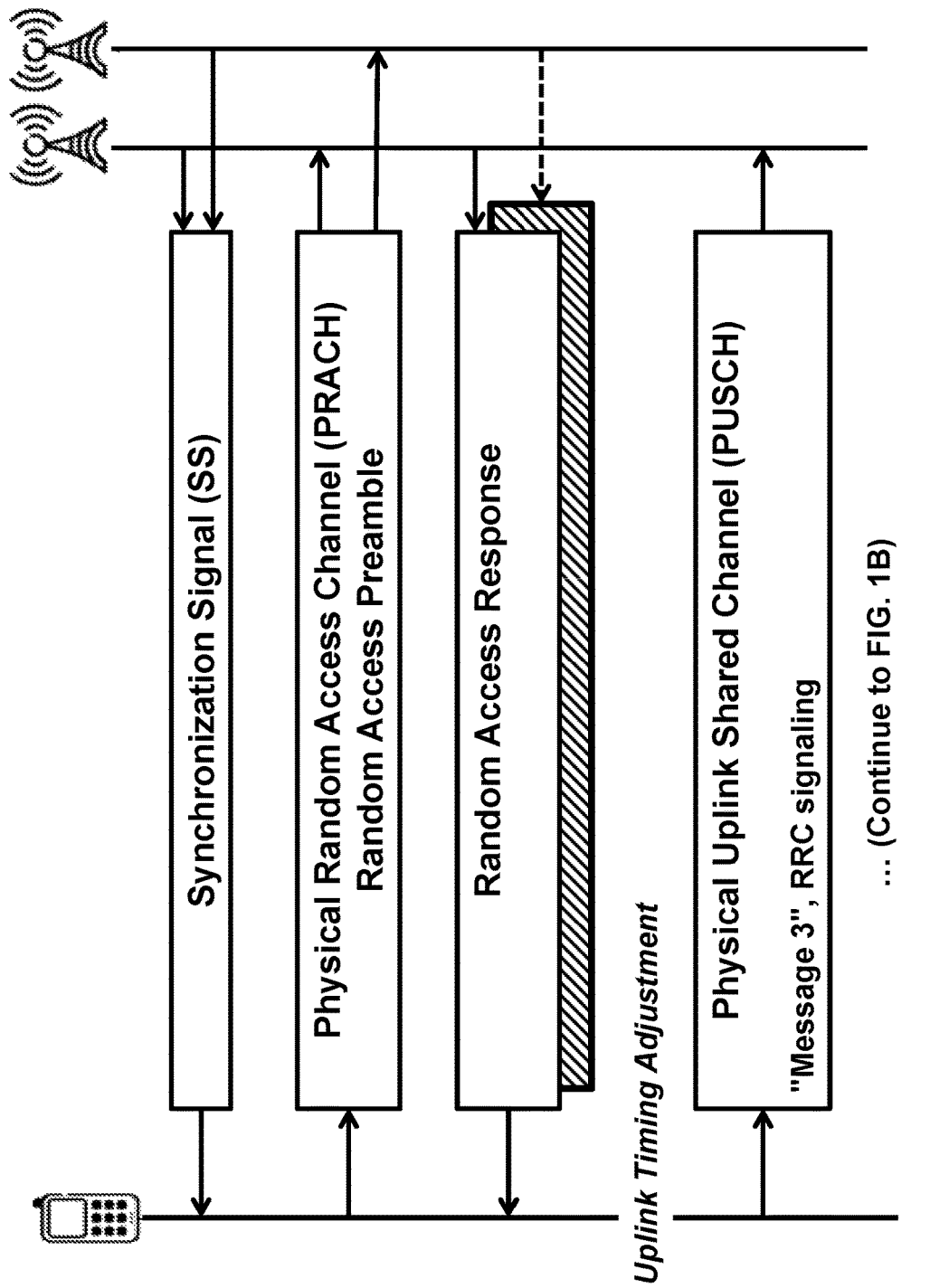
FIGS. 1A-1B are signal diagrams illustrating an example of an initial access procedure.
Figure 1B:
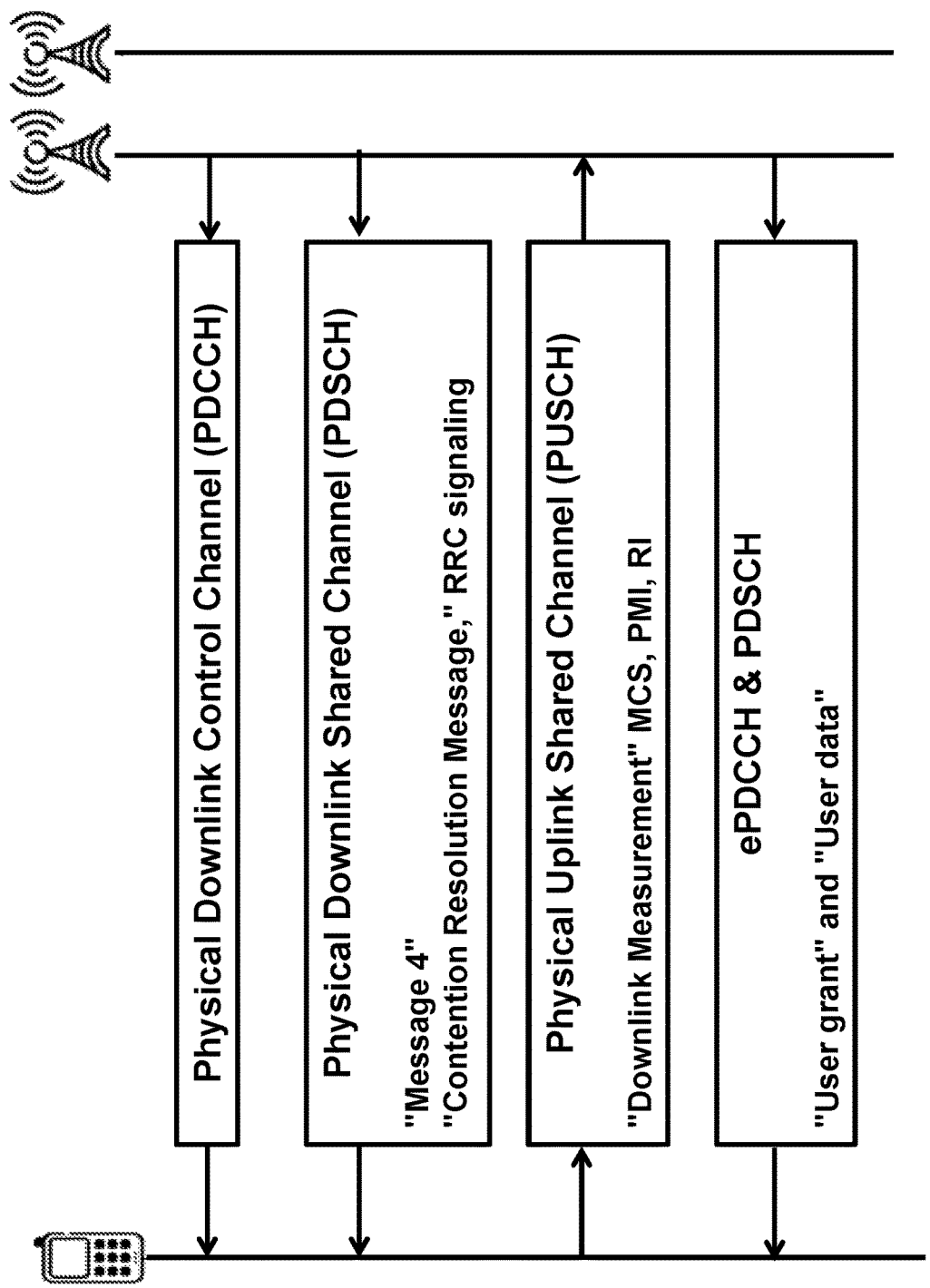
Figure 2:
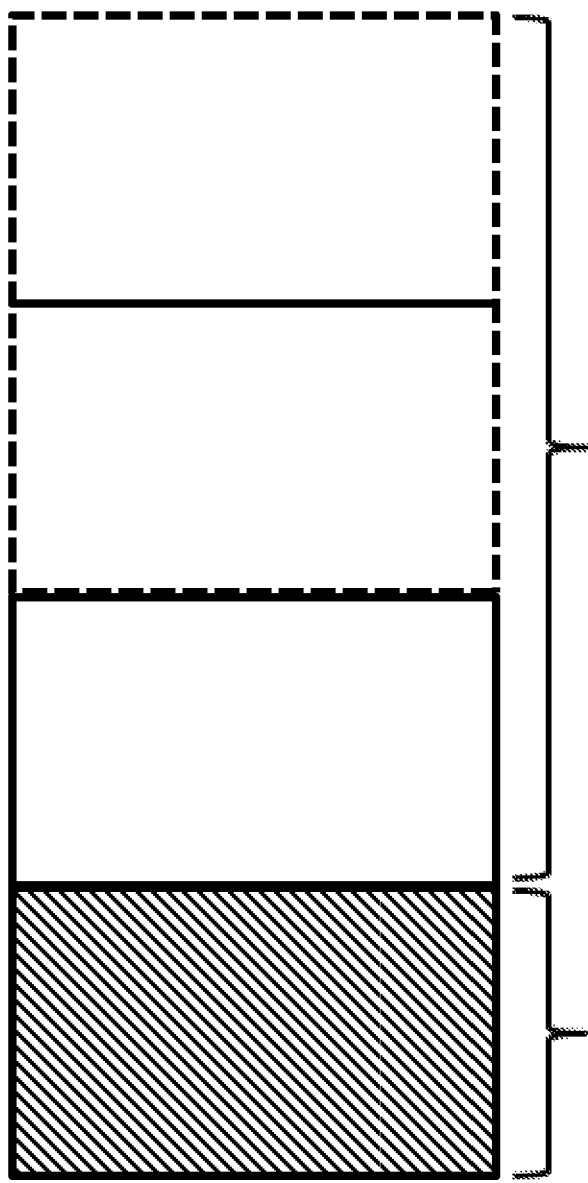
FIG. 2 is a block diagram illustrating an example of a random access response (RAR) signal consisting of a reference signal (RS) and data signal (DS) fields.
Figure 3:
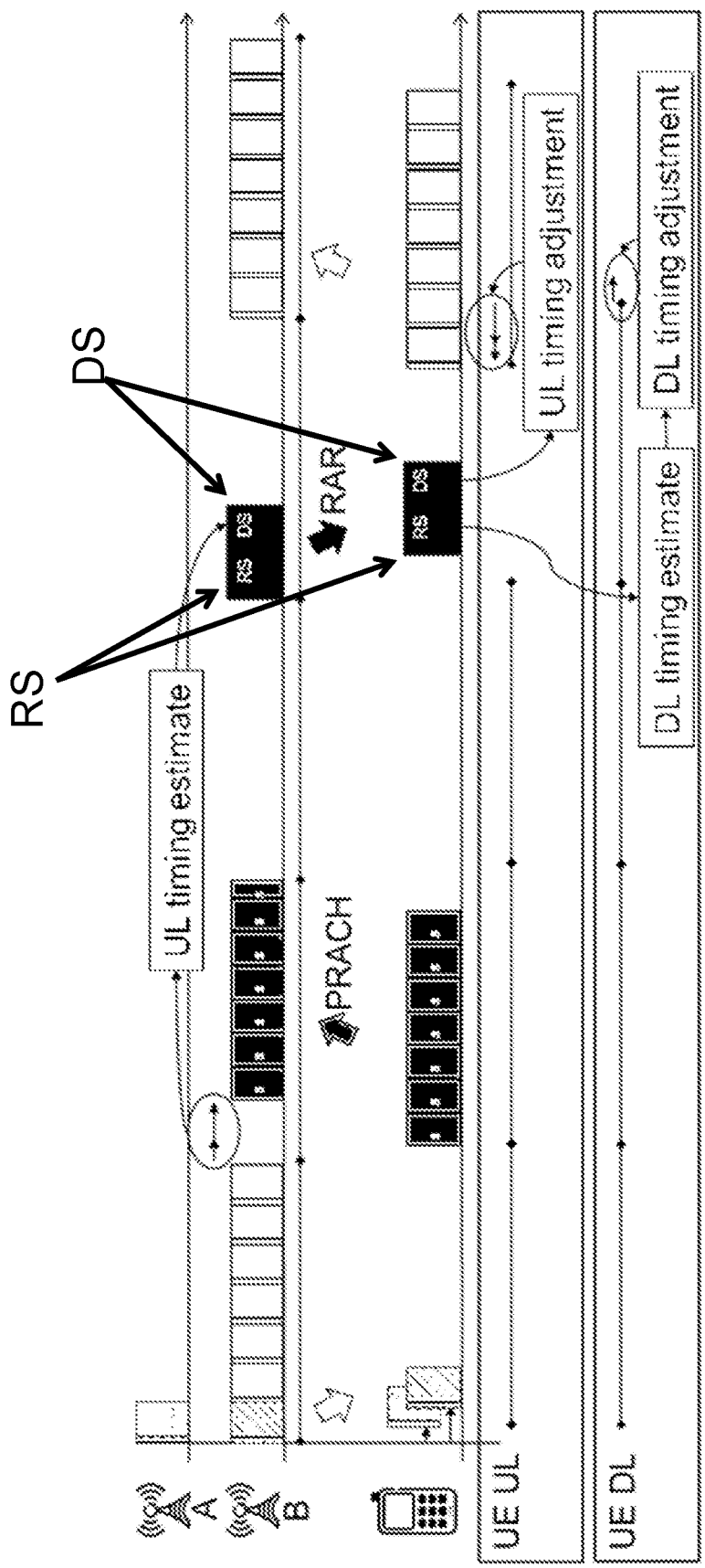
FIG. 3 is a signal flow diagram illustrating an example of a random access procedure.

The Random Access Response (RAR) fulfills various functions, including supporting a varying payload up to N bits (e.g., 100 bits), providing an associated synchronization signal for cases where the reference SS is mismatched in timing or has insufficient signal-to-interference-plus-noise ratio (SINR) for timing estimation, and distinguishing RARs sent to different UEs. To support these required RAR functions, a dedicated signal design may be preferable, for example, rather than reusing Physical Downlink CHannnel (PDCH) or PDCCH. To provide these functions, the signal format depicted in FIG. 2 is proposed for 3GPP.

The RAR consists of two parts, denoted RS and DS. It may cover a subset of the frequency band, e.g., 6 resource blocks (RBs), in two or more OFDM symbols (or whatever modulation scheme is used, e.g., windowed OFDM, filtered OFDM, SC-FDMA, etc.).

The RS part constitutes a subset of the frequency band in a single OFDM symbol. RS contains a known reference sequence that the UE can detect in the time domain, even when the symbol timing in unknown, in order to obtain symbol timing synchronization to process the DS field. A possible signal design for the RS is to use Zadoff-Chu sequences. After RS detection, the RS symbols may be used for channel estimation for DS detection.

In certain embodiments, the RS sequence should be a function of the PRACH preamble transmitted by the UE, the SS (which can be the cell ID) that the UE responded to, or both. The set of possible RS sequences should be large enough to accommodate a sufficient number of unique such combinations. For the purposes of detecting the RS at the UE, there is a single sequence that the UE needs to search for and that is used by all RAR transmissions, or one of few possible such sequences, known to the UE based on the PRACH and/or SS, so as to minimize the UE detection effort. Examples:

RAR sync sequence=F(SS)
RAR sync sequence=F(PRACH)
RAR sync sequence=F(SS, PRACH)

In certain embodiments, the function F may be a one-to-one mapping from input domain to output domain. In other embodiments, the function F may map several input values to the same output value.

The DS part consists of one or more symbols, depending on the payload size in the given deployment. If the number of symbols is small, no additional reference symbols are included.

If the time duration of DS is long in relation to temporal changes in the channel, the DS symbols may include DMRS-like reference symbols as a phase reference. The additional DS symbols, optionally including DMRS, are indicated with the dotted outline in the figure.

The DS message should be encoded using an appropriate codec for short message lengths. In certain embodiments, a CRC (Cyclic Redundancy Check) should be added to verify correct decoding. In certain embodiments, the UE can also use the CRC to blindly detect the message length (one or more symbols) via blind decoding according to different length hypotheses.

The contents of the DS may be scrambled using a UE-specific scrambling sequence. The sequence can, e.g., be determined by the PRACH preamble transmitted by the UE and thus no blind detection at the UE is required for demodulating the DS. Additionally, not only the DS but also the RS could be scrambled using a PRACH preamble dependent sequence to ensure reliable detection of the RAR aimed at the given UE.

The present disclosure includes various additional embodiments. For example, in one embodiment, the RAR synchronization sequence is a Zadoff-Chu sequence. In another embodiment, the RAR synchronization sequence is a scrambled (in time or frequency domain) sequence (e.g., a scrambled Zadoff-Chu sequence), where the scrambling, but not necessarily the underlying (e.g., Zadoff-Chu) sequence itself, depends on some quantity known to both network and UE. In yet another embodiment, the RAR synchronization sequence consists of two parts, similar to the design of mobility reference signals proposed in [R1-1609675, "NR DL mobility measurement signal design"]. In another embodiment, the RAR synchronization sequence comprises an M-sequence. As an example, the PSS in NR may be an M-sequence. Other embodiments may use any other suitable sequence.

In further embodiments, parts of the DS or the whole DS is scrambled using a scrambling sequence that depends on SS (cell ID), PRACH preamble, or both, according to a predetermined mapping. The scrambling sequence may be a real or complex symbol sequence that is multiplied per-element with the DS symbols in the individual REs. The UE also knows the mapping, so it can derive the same descrambling sequence based on e.g., the SS and PRACH preamble. It can then apply the reverse operation, multiplication the received DS REs with the complex conjugate of the corresponding scrambling sequence value.

In one embodiment, the RAR synchronization sequence, and/or possibly the DS scrambling sequence, depends on broadcasted control information. For example, the RAR RS can depend on the PRACH resource configuration as specified in a broadcast channel transmitted together with the SS. An illustration is given in [R1-1609670, "NR random access procedure"], where a PBCH (Physical Broadcast Channel) is transmitted in the OFDM symbol after SS. This master information block (MIB), possibly in combination with other broadcast channels, is used to configure the PRACH resources.

In other embodiments, the RAR sync sequence is a function also of some additional quantity/information X known only the network but not the UE:

RAR sync sequence=F(SS, X)
RAR sync sequence=F(PRACH, X)
RAR sync sequence=F(SS, PRACH, X)

Including the additional information X in the function may allow for pooling and statistical multiplexing of sync sequences.

As explained in the following, an advantage of including the additional information X is that it allows reducing the total number of available RAR sync sequences, which in turn makes it easier to design sequences with good auto- and cross-correlation properties.

It is noted that in embodiments for which the RAR sync sequence is a function of X, the UE will have to search for all possible values of X. The added searching complexity may be minimized if the set of possible X values is small (e.g., 3, or even just 2, which would be enough for the key advantage).

The reduction in the total number of RAR sync sequences is achieved by pooling sequences between cells so that statistical multiplexing can be benefitted from. For example, the RAR sync sequence can be determined as F(SS, X), where X is 0, 1, or 2, and where F(SS_index, X)=3*floor(SS_index/3)+X. In other words, effectively the set of all SS indices are divided into groups of three SS indices each, where any index in a group can map to any other index within the group, and where which index maps to which is determined by X. The network can then use inter-TRP coordination of X to avoid collisions.

The reduction in the need for many RAR sync sequences can be understood as follows: Assume probability of a UE making RA in a cell is p<<1, then probability that two UEs make RA at the same time is p*p, which is hence the probability of collision if we use F(SS_index) alone. However, with the proposed technique, the network is free to use, e.g., X=0 for one UE and X=1 for the other so that collision is avoided. The only time this fails is when there is a need for four or more RAR sync sequences in the group (i.e., in the "cell" defined by SS), which is roughly 3*p*p*p*p. Since p<<1, we have 3*p^4<<p^2, i.e., the collision risk is dramatically reduced for a given number of available RAR sync sequences. Hence, the total number of RAR sync sequences needed in a given scenario is smaller.

Note that if TRPs cannot coordinate with each other fast enough, they can in the above example still randomly select two Xs in case they have two RARs to transmit (thus avoiding a certain collision and instead just have a collision with very low probability), or just fall back to X=SS_index mod 3.

In summary, because the RAR sync sequence is not uniquely determined by PRACH when the RAR sync sequence is also a function of X known only to the network, the UE does not know exactly what RAR sync sequence to use. Thus, the UE searches over a set of hypotheses based on the possible values of X (e.g., X=0, X=1, and X=2).

Figure 4:
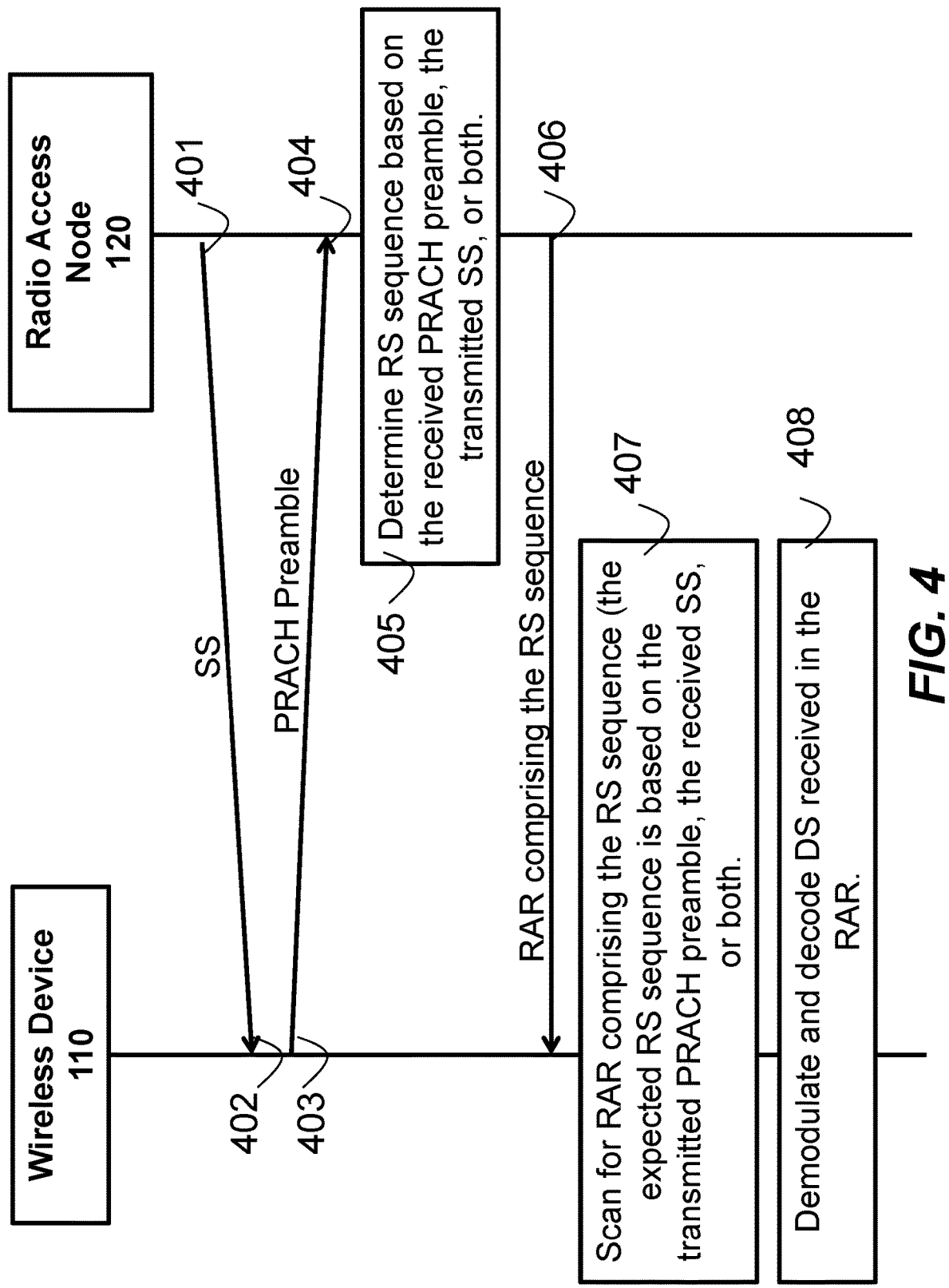
FIG. 4 is a signal flow diagram illustrating an example of a random access procedure comprising RS sequence selection, in accordance with certain embodiments.

FIG. 4 illustrates an example flowchart, in accordance with certain embodiments of the present disclosure. For purposes of example, FIG. 4 illustrates signalling between a wireless device 110 (such as a UE) and a radio access node 120 (such as a TRP). At step 401, the network transmits an SS. For example, the SS may be transmitted by radio access node 120. At step 402, the SS is received by wireless device 110 or another network node. At step 403, wireless device 110 transmits a PRACH preamble. At step 404, radio access node 120 receives the PRACH preamble from wireless device 110 (or other network node). At step 405, the network determines and at step 406 the network transmits a RAR synchronization sequence, where the sequence depends on the received PRACH preamble, the transmitted SS, or both. At step 407, wireless device 110 scans for the RAR synchronization sequence(s) it may expect based on which SS it heard and/or which PRACH preamble it transmitted. At step 408, wireless device 110 demodulates and decodes RAR DS.

Not all of the steps need always be present, and the order of the steps may vary to some extent. In an embodiment of the above example, self-organized self-backhauling, new TRPs could initially act as UEs.

Figure 5:
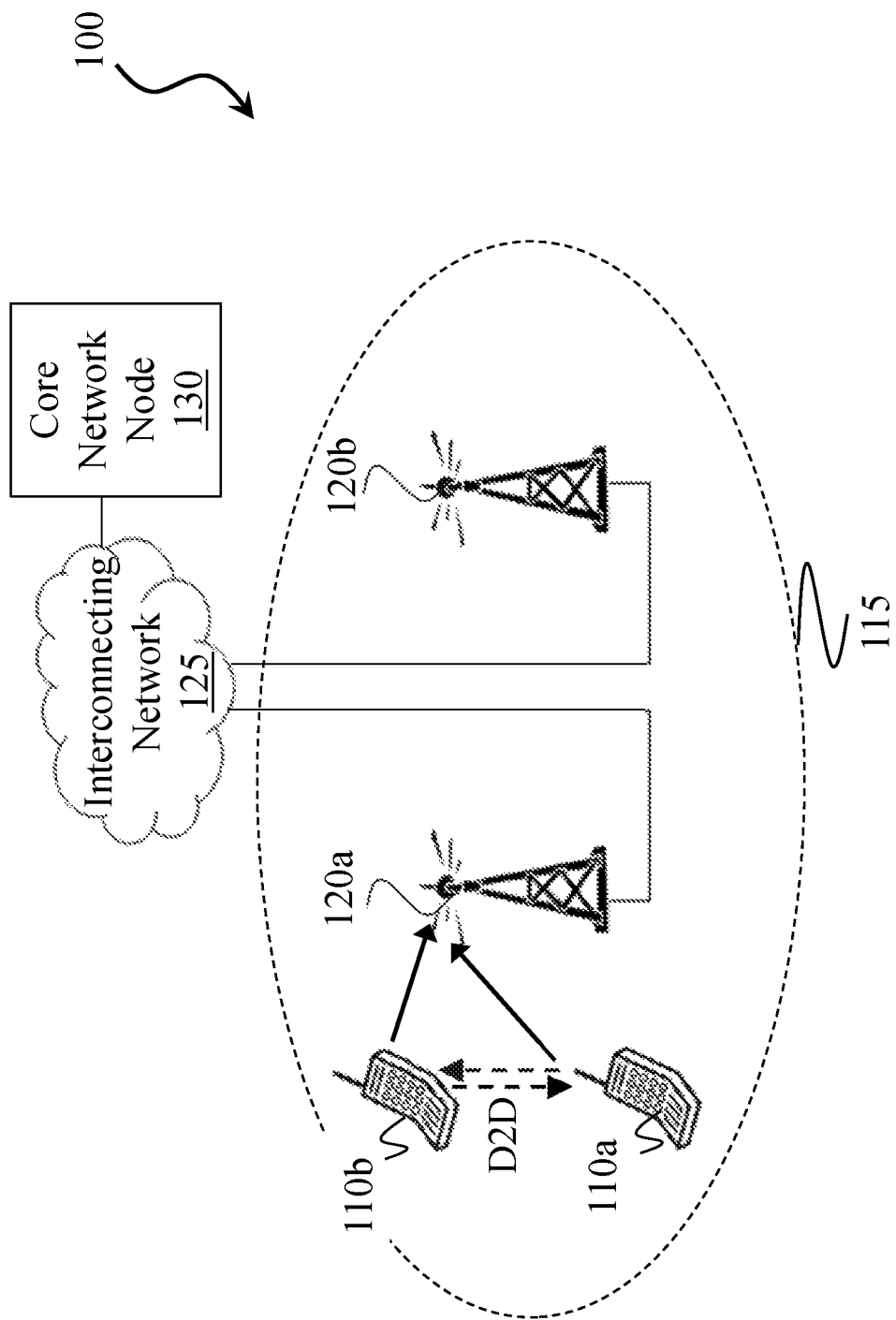
FIG. 5 is a block diagram illustrating an example of a wireless network, in accordance with certain embodiments.

Embodiments of the present disclosure may be implemented in any suitable network, such as the wireless network 100 illustrated in FIG. 5. Wireless network 100 includes wireless devices 110a-110b (which may be referred to interchangeably as user equipments, UEs) and a plurality of radio access nodes 120a-120b (e.g., enhanced Node Bs (eNBs), gNBs, TRPs, etc.) connected to one or more core network nodes 130 via an interconnecting network 125. Wireless devices 110 within coverage area 115 may each be capable of communicating directly with radio access nodes 120 over a wireless interface. In certain embodiments, wireless devices may also be capable of communicating with each other via device-to-device (D2D) communication. In certain embodiments, radio access nodes 120a-120b may also be capable of communicating with each other via various interfaces/protocols (e.g., x2 in LTE, or other similar interface/protocol).

As an example, wireless device 110a may communicate with radio access node 120a over a wireless interface. That is, wireless device 110a may transmit wireless signals and/or receive wireless signals from radio access node 120a. The wireless signals may contain voice traffic, data traffic, control signals, and/or any other suitable information. In some embodiments, an area of wireless signal coverage associated with a radio access node 120 may be referred to as a cell 115.

In some embodiments, wireless device 110 may be interchangeably referred to by the non-limiting term user equipment (UE). Wireless device 110 can be any type of wireless device capable of communicating with a network node (e.g., radio access node 120) or another wireless device 110 (e.g., UE) over radio signals. Wireless device 110 may also be a radio communication device, target device, device to device (D2D) UE, machine type UE or UE capable of machine-to-machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc. An example embodiment of wireless device 110 is described in more detail below with respect to FIG. 6.

In some embodiments, generic terminology "network node" is used. It can be any kind of network node which may comprise of a radio network node such as radio access node 120 (which can include a TRP, base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., mobile management entity, MME, self-organizing network node, SON node, a coordinating node, positioning node, minimization of drive test node, MDT node, etc.), or even an external node (e.g., 3rd party node, a node external to the current network), etc. The network node may also comprise test equipment. The term "radio node" may be used to denote a UE (e.g., wireless device 110) or a radio network node (e.g., radio access node 120). An example embodiment of radio access node 120 is described in more detail below with respect to FIG. 7.

In certain embodiments, radio access nodes 120 may interface with a radio network controller. The radio network controller may control radio access nodes 120 and may provide certain radio resource management functions, mobility management functions, and/or other suitable functions. In certain embodiments, the functions of the radio network controller may be included in radio access node 120. The radio network controller may interface with a core network node 130. In certain embodiments, the radio network controller may interface with the core network node 130 via an interconnecting network 125.

The interconnecting network 125 may refer to any interconnecting system capable of transmitting audio, video, signals, data, messages, or any combination of the preceding. The interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 130 may manage the establishment of communication sessions and various other functionalities for wireless devices 110. Examples of core network node 130 may include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. Wireless devices 110 may exchange certain signals with the core network node using the non-access stratum layer. In non-access stratum signaling, signals between wireless devices 110 and the core network node 130 may be transparently passed through the radio access network. In certain embodiments, radio access nodes 120 may interface with one or more network nodes over an internode interface. For example, radio access nodes 120a and 120b may interface over an X2 interface.

Although FIG. 5 illustrates a particular arrangement of network 100, the present disclosure contemplates that the various embodiments described herein may be applied to a variety of networks having any suitable configuration. For example, network 100 may include any suitable number of wireless devices 110 and radio access nodes 120, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR, the embodiments may be applicable to any suitable RAT, such as Universal Mobile Telecommunications System Terrestrial Radio Access Network (UTRA), enhanced UTRA (E-UTRA), narrow band internet of things (NB-IoT), WiFi, Bluetooth, next generation RAT (NR, NX), 4G, 5G, LTE FDD/TDD, Wideband Code Division Multiple Access (WCDMA), High Speed Packet Access (HSPA), Global System for Mobile Communication (GSM), GSM Edge Radio Access Network (GERAN), WLAN, CDMA2000, etc.

Figure 6:
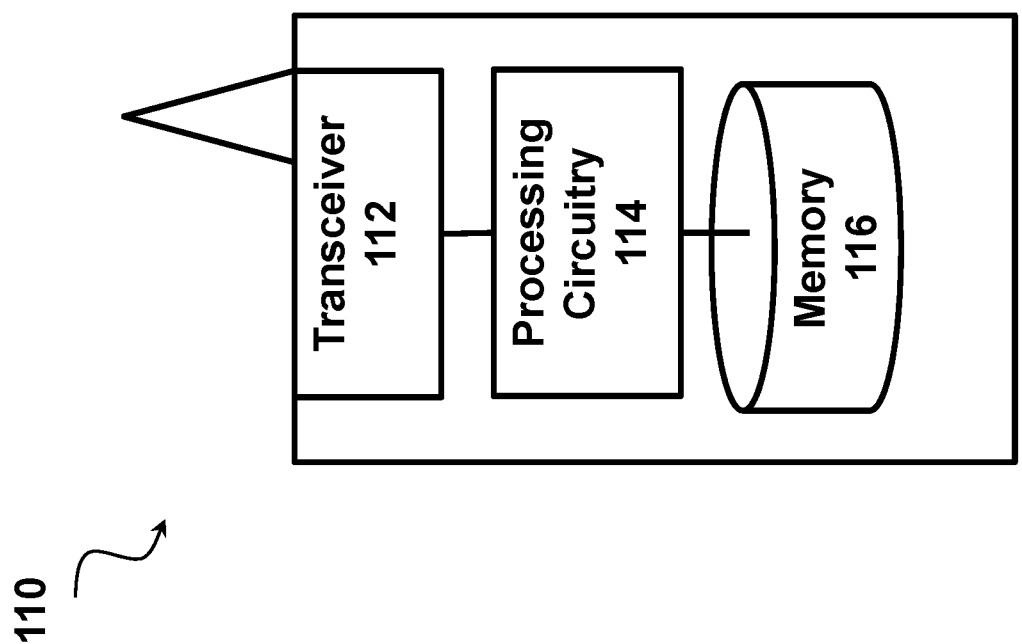
FIG. 6 is a block diagram illustrating an example of a wireless device, such as a UE, in accordance with certain embodiments.

FIG. 6 is a block diagram of an exemplary wireless device 110, in accordance with certain embodiments. Wireless device 110 includes a transceiver 112, processing circuitry 114, and memory 116. In some embodiments, the transceiver 112 facilitates transmitting wireless signals to and receiving wireless signals from radio access node 120 (e.g., via an antenna), the processing circuitry 114 executes instructions to provide some or all of the functionality described above as being provided by wireless device 110, and the memory 116 stores the instructions for execution by the processing circuitry 114.

The processing circuitry 114 may include any suitable combination of hardware and software implemented in one or more modules to execute instructions and manipulate data to perform some or all of the described functions of wireless device 110, such as the functions of wireless device 110 determining an RS sequence based at least in part on the SS and/or the PRACH preamble, and searching for a RAR according to the determined RS sequence. Similarly, processing circuitry 114 may be configured to perform any of the methods described as being performed by a wireless device 110 or UE, such as the methods described with respect to FIGS. 4, 10, and/or 12. In some embodiments, the processing circuitry 114 may include, for example, one or more processors, one or more computers, one or more central processing units (CPUs), one or more microprocessors, one or more applications, one or more application specific integrated circuits (ASICs), one or more field programmable gate arrays (FPGAs) and/or other logic.

The memory 116 is generally operable to store instructions, such as a computer program, software, an application including one or more of logic, rules, algorithms, code, tables, etc. and/or other instructions capable of being executed by the processing circuitry 114. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processing circuitry 114 of wireless device 110.

Other embodiments of wireless device 110 may include additional components beyond those shown in FIG. 6 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 114. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 7:
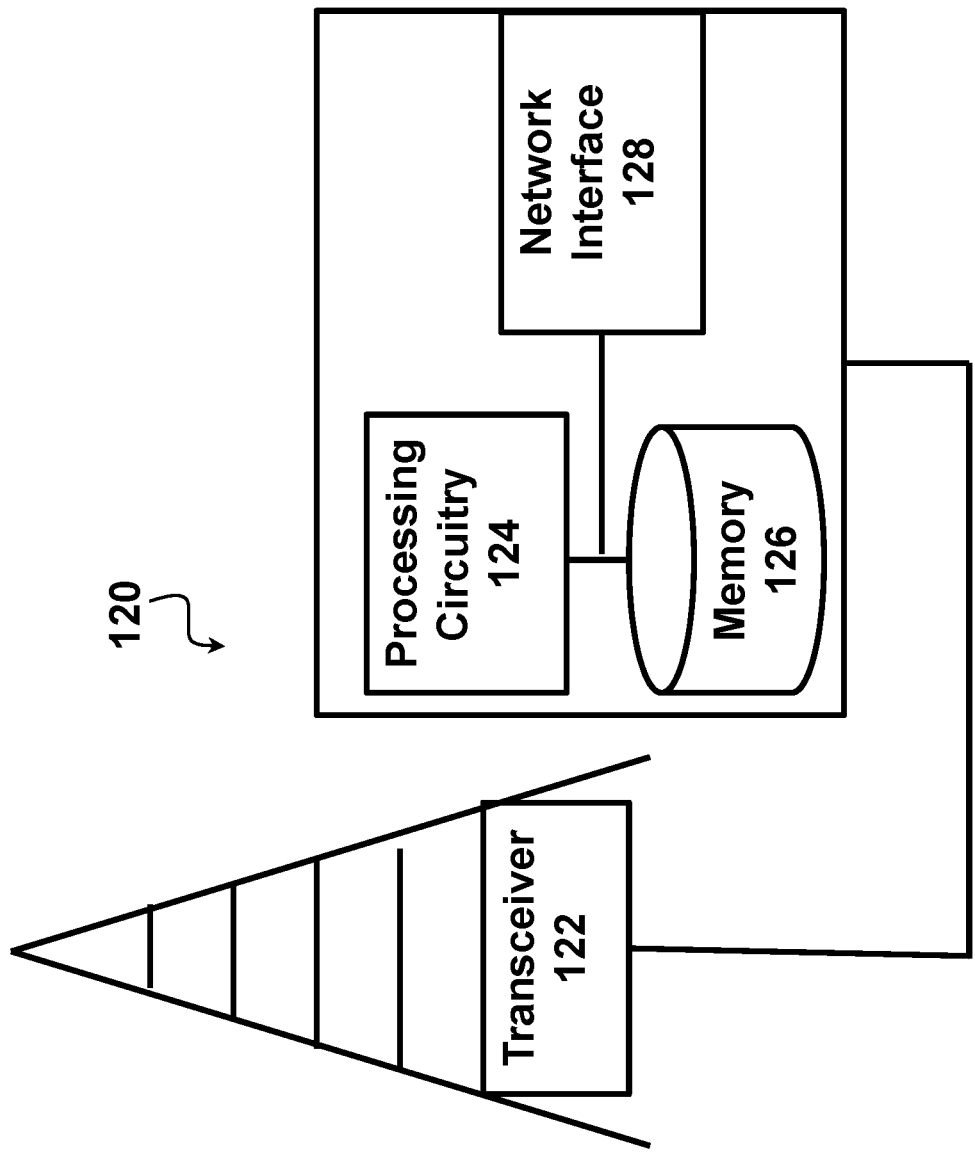
FIG. 7 is a block diagram illustrating an example of a network node, such as a TRP, in accordance with certain embodiments.

FIG. 7 is a block diagram of an exemplary radio access node 120, in accordance with certain embodiments. Radio access node 120 may include one or more of a transceiver 122, processing circuitry 124, memory 126, and network interface 128. In some embodiments, the transceiver 122 facilitates transmitting wireless signals to and receiving wireless signals from wireless device 110 (e.g., via an antenna), the processing circuitry 124 executes instructions to provide some or all of the functionality described above as being provided by a radio access node 120, the memory 126 stores the instructions for execution by the processing circuitry 124, and the network interface 128 communicates signals to backend network components, such as a gateway, switch, router, Internet, Public Switched Telephone Network (PSTN), core network nodes or radio network controllers, etc.

The processing circuitry 124 may include any suitable combination of hardware and software implemented in one or more modules to execute instructions and manipulate data to perform some or all of the described functions of radio access node 120, such as determining an RS sequence based at least in part on the SS and/or the PRACH preamble, and transmitting a RAR comprising the RS sequence. Similarly, processing circuitry 124 may be configured to perform any of the methods described as being performed by a network node/radio access node 120, such as the methods described with respect to FIGS. 4, 9, and/or 11. In some embodiments, the processing circuitry 124 may include, for example, one or more processors, one or more computers, one or more central processing units (CPUs), one or more microprocessors, one or more applications, one or more application specific integrated circuits (ASICs), one or more field programmable gate arrays (FPGAs) and/or other logic.

The memory 126 is generally operable to store instructions, such as a computer program, software, an application including one or more of logic, rules, algorithms, code, tables, etc. and/or other instructions capable of being executed by processing circuitry 124. Examples of memory 126 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, the network interface 128 is communicatively coupled to the processing circuitry and may refer to any suitable device operable to receive input for radio access node 120, send output from radio access node 120, perform suitable processing of the input or output or both, communicate to other devices, or any combination of the preceding. The network interface may include appropriate hardware (e.g., port, modem, network interface card, etc.) and software, including protocol conversion and data processing capabilities, to communicate through a network.

Other embodiments of radio access node 120 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Processing circuitry, interfaces, and memory similar to those described with respect to FIGS. 6-7 may be included in other network nodes (such as core network node 130). Other network nodes may optionally include or not include a wireless interface (such as the transceiver described in FIGS. 6-7).

Figure 8:
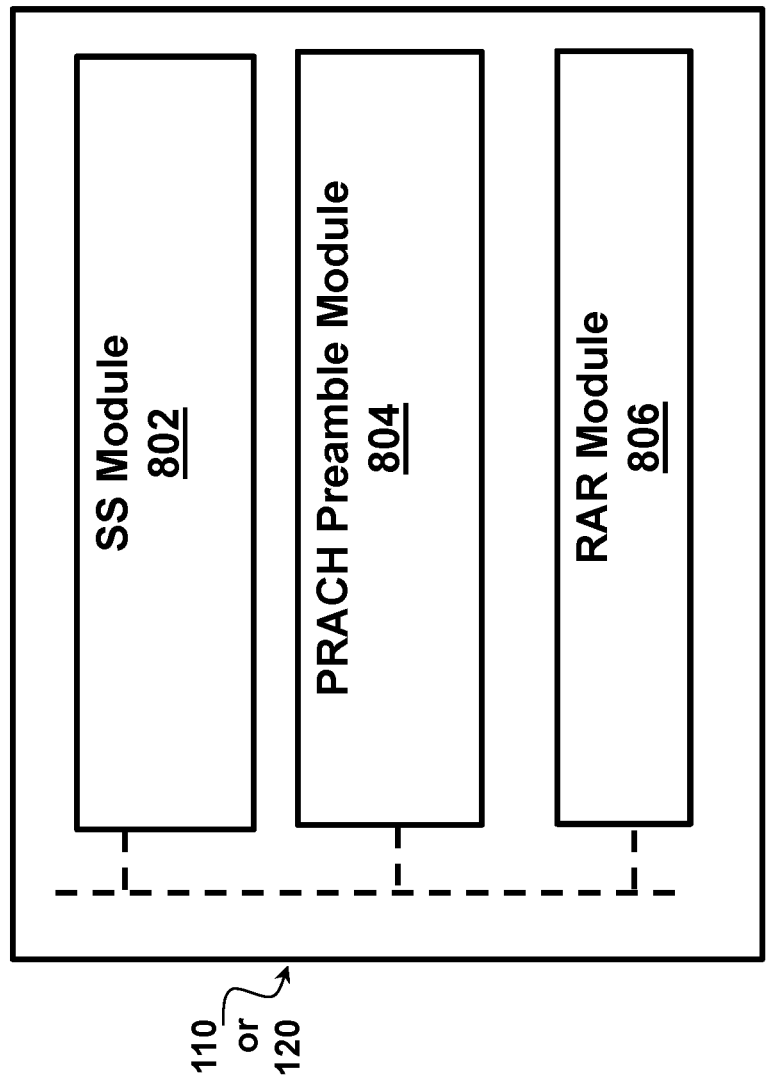
FIG. 8 is a block diagram illustrating an example of modules that may be included in a wireless device or a network node, in accordance with certain embodiments.

FIG. 8 illustrates an example of modules that may be included in wireless device 110 or a network node (e.g., radio access node 120, such as a TRP). Wireless device 110 or radio access node 120 may include any one or more of the modules. The modules may be integrated or separated. The modules may be substituted or combined with any other modules suitable to perform the functionality described. In certain embodiments, the modules are implemented using processing circuitry (such as described with respect to FIGS. 6-7). The modules in FIG. 8 include an SS module 802, a PRACH Preamble Module 804, and a RAR Module 806.

Figure 9:
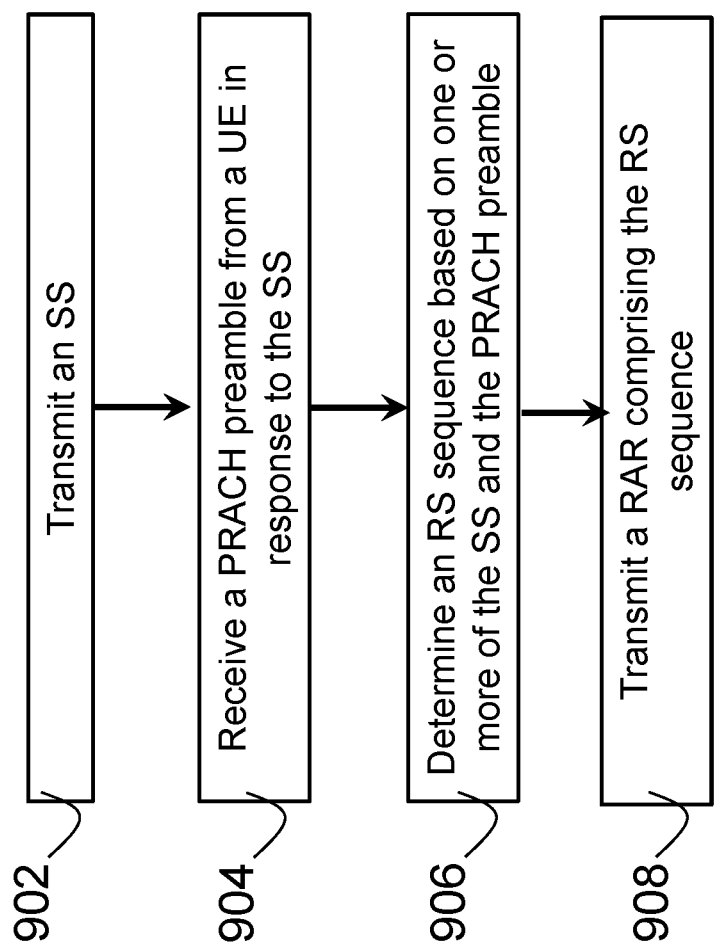
FIGS. 9 and 11 are flow charts illustrating examples of methods for use in a network node, in accordance with certain embodiments.
Figure 10:
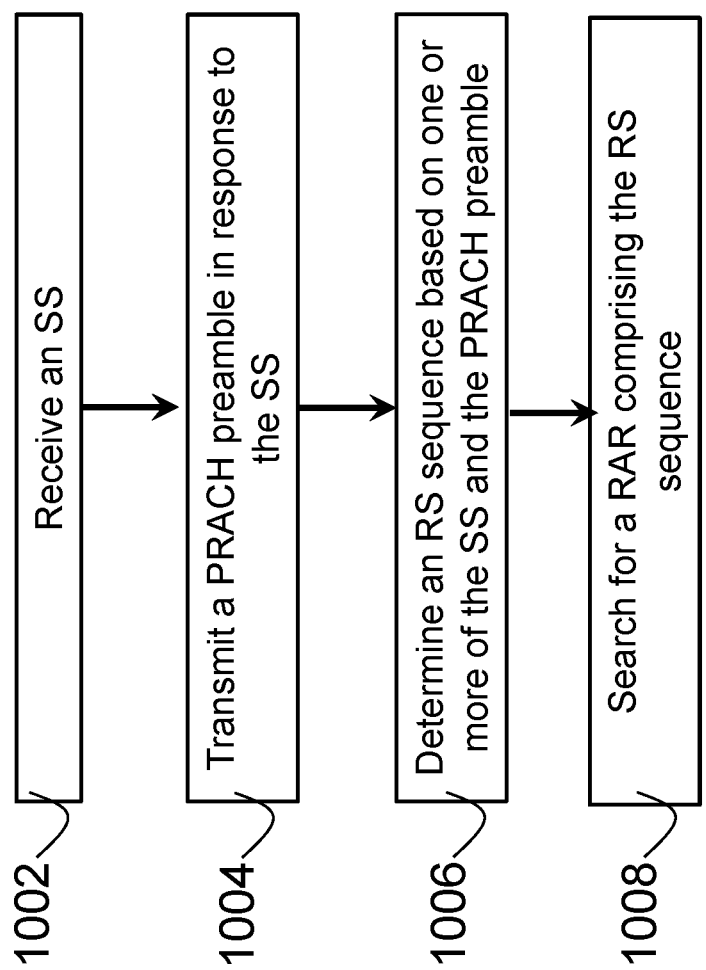
FIGS. 10 and 12 are flow charts illustrating examples of methods for use in a wireless device, in accordance with certain embodiments.

In certain embodiments of wireless device 110, SS module 802 may receive an SS. The SS may be received as a broadcast from a network node 120 and may comprise basic information about the network node 120. PRACH preamble module 804 may transmit a preamble to the network node 120 via a random access channel (e.g., module 804 may transmit a PRACH preamble in response to the SS). RAR module 806 may determine one or more RS sequences based at least in part on the preamble transmitted via the random access channel and/or the SS received from the network node 120. For each of the determined RS sequences, the RAR module 806 may search for a RAR comprising the RS sequence. The RAR module 806 may further demodulate and decode DS received in the RAR(s) comprising the determined RS sequence(s). In certain embodiments of the network node/radio access node 120, SS module 802 may transmit an SS. For example, SS module 802 may broadcast the SS to one or more wireless devices 110. The SS may comprise basic information about the network node 120. PRACH preamble module 804 may receive a preamble from one of the wireless devices 110 via a random access channel (e.g., module 804 may receive a PRACH preamble in response to the SS). RAR module 806 may determine an RS sequence based at least in part on the preamble received via the random access channel and/or based at least in part on the SS. Additionally, RAR module 806 may transmit a RAR comprising the determined RS sequence. FIG. 9 illustrates an example of a method in a network node (e.g., radio access node 120) and FIG. 10 illustrates an example of a method in a wireless device 110, in accordance with certain embodiments. In general, the methods select the RAR synchronization sequences based at least in part on (dependent on) quantities/information known to both radio access node 120 and wireless device 110. This information may include the SS and/or PRACH. This information may also include other mutually known parameters, e.g., parameters included in the MIB. Further, in some embodiments, the information may also include some information X known only to the network node. Any suitable technique may be used to determine which information a given embodiment should use to determine the RAR synchronization sequence (e.g., whether to use SS, PRACH, X, and/or other information). For example, a determination of which information to use could be pre-configured (e.g., based on a standard) or could be broadcast in the SS.

In particular, FIG. 9 illustrates a method of RAR synchronization sequence selection at a network node. The method comprises receiving a PRACH preamble from a wireless device 110 (e.g., UE) in response to an SS (step 904), determining an RS sequence based on one or more of the SS and the PRACH preamble (step 906), and transmitting a RAR comprising the RS sequence (step 908). Also disclosed is a network node (e.g., radio access node 120) configured to perform RAR synchronization sequence selection. The network node comprises a memory and processing circuitry, such as one or more processors configured to receive a PRACH preamble from a wireless device 110 (e.g., UE) in response to an SS, determine an RS sequence based on one or more of the SS and the PRACH preamble, and transmit a RAR comprising the RS sequence.

In certain embodiments, the method/network node also transmits the SS (e.g., step 902, transmitting the SS prior to receiving the PRACH preamble from the UE in response to the SS).

In certain embodiments, the RS sequence comprises a Zadoff-Chu sequence, a scrambled Zadoff-Chu sequence, or a two-part sequence (similar to SS). In certain embodiments, the RAR comprises a payload (DS) and the RAR payload is (fully or partially) scrambled using a scrambling sequence that depends on the SS, the PRACH preamble, or both. In certain embodiments, the determined RS sequence is a function of some additional quantity X unknown to the UE (for pooling/statistical multiplexing).

FIG. 10 illustrates a method of RAR reception at a wireless device 110, comprising: receiving an SS (step 1002), transmitting a PRACH preamble in response to the SS (step 1004), determining an RS sequence based on one or more of the SS and the PRACH preamble (step 1006), and searching for a RAR, having configured the receiver according to the determined RS sequence (step 1008). Also disclosed is a wireless device 110, comprising: a memory and processing circuitry, such as one or more processors configured to: receive an SS, transmit a PRACH preamble in response to the SS, determine an RS sequence based on one or more of the SS and the PRACH preamble, and search for a RAR, having configured the receiver according to the determined RS sequence.

In certain embodiments, the RS sequence comprises a Zadoff-Chu sequence, a scrambled Zadoff-Chu sequence, or a two-part sequence (similar to SS). In certain embodiments, the RAR comprises a payload (DS) and the RAR payload is (fully or partially) scrambled according to a scrambling sequence that depends on the SS, the PRACH preamble, or both. In certain embodiments, the determined RS sequence is a function also of some additional quantity X unknown to the UE (for pooling/statistical multiplexing).

The examples in FIGS. 9 and 10 are non-limiting. Other embodiments may include other features, for example, as described in other portions of the present disclosure.

Figure 11:
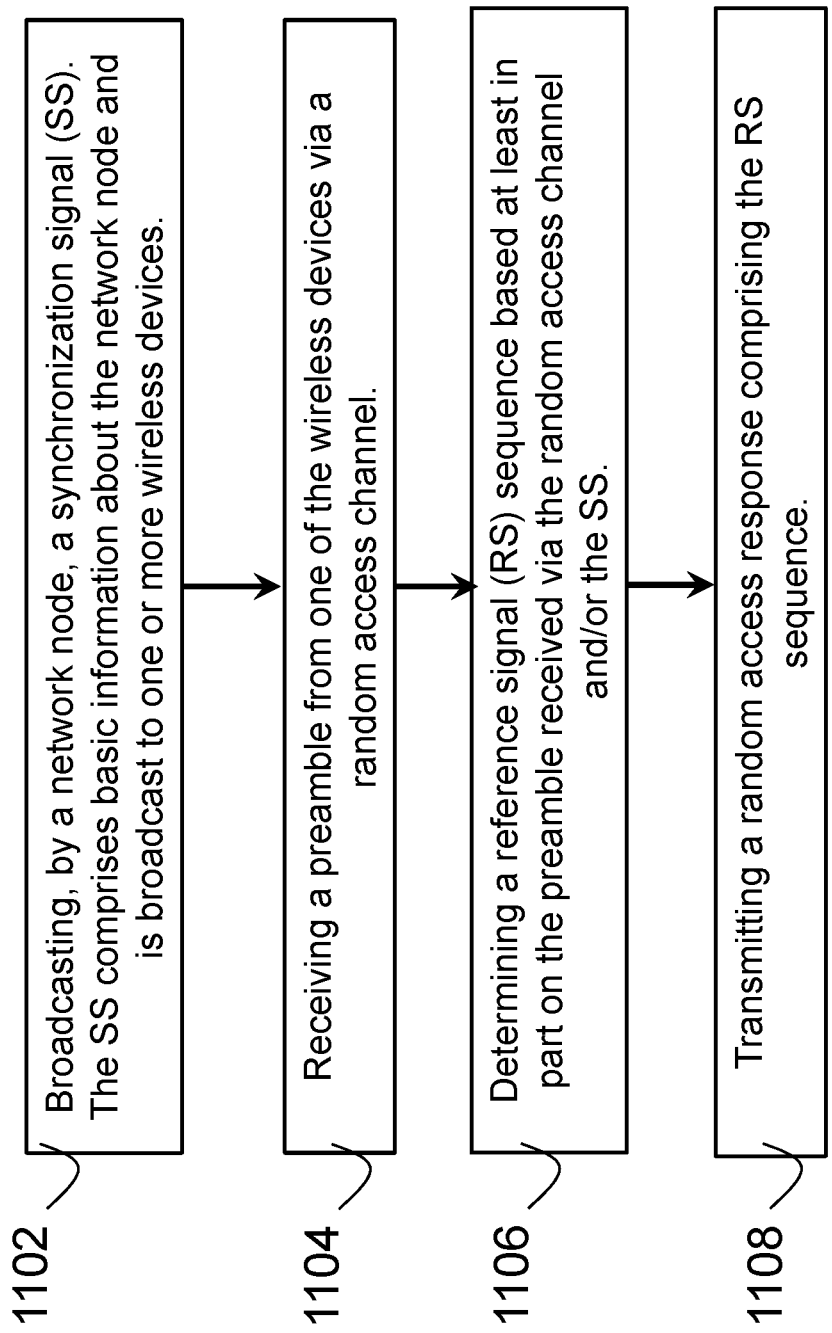

FIG. 11 illustrates another example of a method for use in a network node, such as radio access node 120. At step 1102, the method broadcasts an SS to one or more wireless devices 110. The SS comprises basic information about the network node 120, such as a cell ID. In some embodiments, the SS may comprise transmitting a PBCH that includes timing information.

At step 1104, the method receives a preamble from one of the wireless devices 110 via a random access channel. As an example, in certain embodiments using NR, the preamble may be an NR-RACH preamble received via an NR-RACH.

At step 1106, the method determines an RS sequence based at least in part on the SS transmitted in step 1102 and/or the preamble received in step 1104. As an example, in certain embodiments the SS comprises a primary synchronization signal (PSS) and a secondary synchronization signal (SSS), and the RS sequence is based at least in part on the PSS, the SSS, or both. As another example, in certain embodiments the SS comprises a cell ID and the RS sequence is based at least in part on the cell ID. In certain embodiments, the RS sequence comprises a Zadoff-Chu sequence, a scrambled Zadoff-Chu sequence, an M-sequence, or other suitable sequence. Optionally, the RS sequence may be determined in part based on some additional quantity X (discussed above) that is known to the network node and unknown to the wireless device 110, e.g., for the purpose of pooling/statistical multiplexing.

At step 1108, the method transmits a RAR comprising the RS sequence determined at step 1106. In certain embodiments, the RAR can be transmitted using the PDCCH, PDSCH, or both. In certain embodiments, the RAR can be transmitted using a channel dedicated to random access responses. In an embodiment, the RAR comprises a payload that is fully or partially scrambled using a scrambling sequence that depends on the SS transmitted in step 1102, the preamble received in step 1104, or both.

Figure 12:
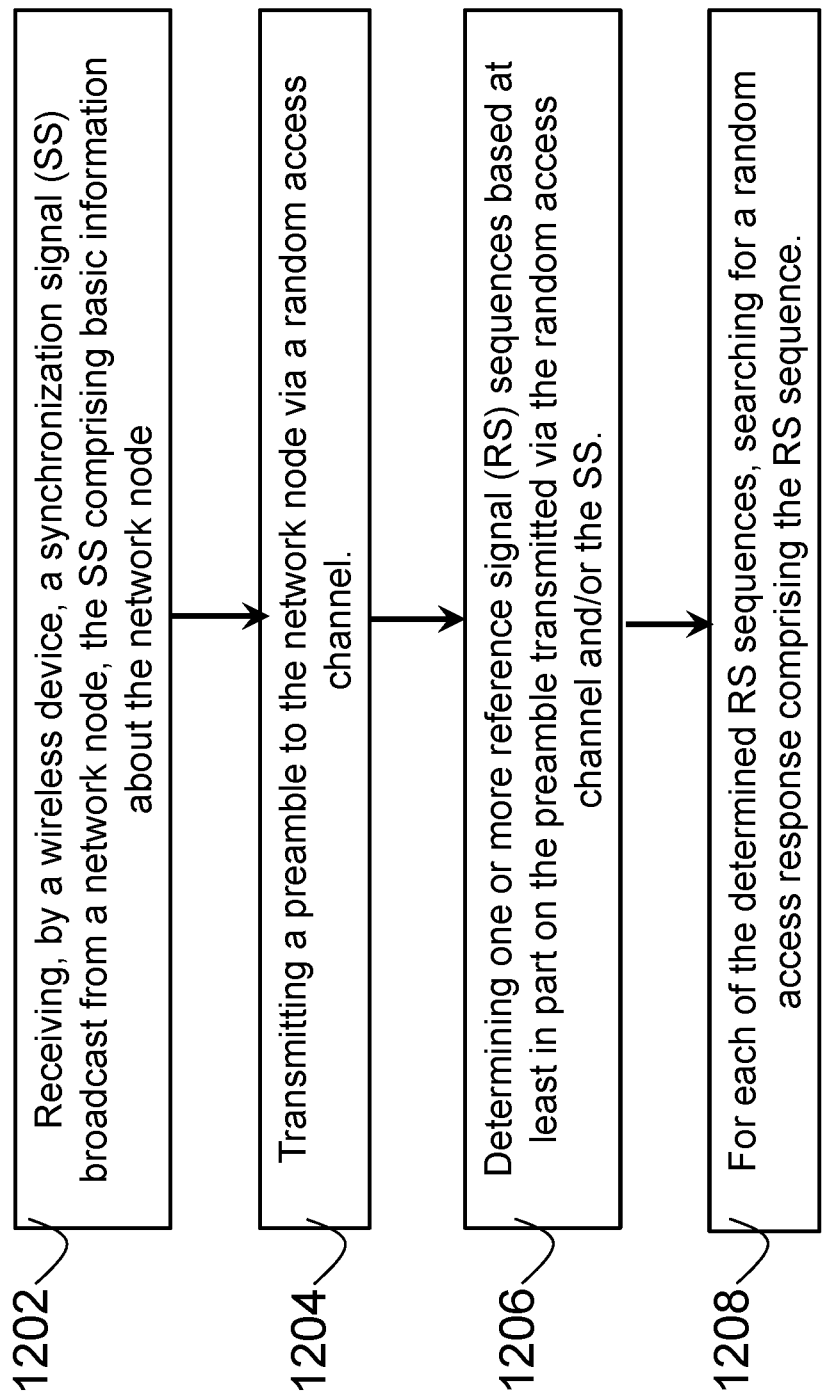

FIG. 12 illustrates another example of a method for use in a wireless device 110. At step 1202, the method receives an SS from a network node, such as radio access node 120. The SS may be received in a broadcast message that comprises basic information about the network node 120, such as a cell ID. In some embodiments, the SS may comprise a PBCH that includes timing information.

At step 1204, the method transmits a preamble from to the network node via a random access channel. As an example, in certain embodiments using NR, the preamble may be an NR-RACH preamble transmitted via an NR-RACH.

At step 1206, the method determines one or more RS sequences based at least in part on the SS received in step 1202 and/or the preamble transmitted in step 1204. As an example, in certain embodiments the SS comprises a primary synchronization signal (PSS) and a secondary synchronization signal (SSS), and the RS sequence is based at least in part on the PSS, the SSS, or both. As another example, in certain embodiments the SS comprises a cell ID and the RS sequence is based at least in part on the cell ID. In certain embodiments, the RS sequence comprises a Zadoff-Chu sequence, a scrambled Zadoff-Chu sequence, an M-sequence, or other suitable sequence.

Optionally, the RS sequence may be determined in part based on some additional quantity X (discussed above) that is known to the network node and unknown to the wireless device 110, e.g., for the purpose of pooling/statistical multiplexing. Thus, wireless device 110 may determine RS sequences associated with each possible value of X. For example, if X is possible to be selected from a set comprising X=0, 1, or 2, wireless device 110 may determine three RS sequences, one for each possible value of X. In the example, the RS sequence may be determined based on the function F(SS and/or preamble, 0), F(SS and/or preamble, 1), and F(SS and/or preamble, 2).

At step 1208, for each RS sequence determined at step 1206, the method searches for a RAR comprising the RS sequence. In certain embodiments, the RAR can be received using the PDCCH, PDSCH, or both. In certain embodiments, the RAR can be received using a channel dedicated to random access responses. In an embodiment, the RAR comprises a payload that is fully or partially scrambled using a scrambling sequence that depends on the SS received in step 1202, the preamble transmitted in step 1204, or both. For the RAR message(s) comprising the determined RS sequence(s), wireless device 110 may demodulate and decode the RAR DS.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein.

All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Certain terminology throughout the disclosure has referred to the terms "RS," "RS signal," "RS field," "RS sequence," "RAR sync signal," "RAR sync [synchronization] sequence," "sync [synchronization] sequence," etc. These terms are largely used as synonyms. Sometimes the different terms are used to emphasize different aspects of the RS, for example, "RAR sync sequence" is sometimes used to emphasize that it is the sequence of complex constellation symbols that is being discussed (rather than the RS field as opposed to the DS field, or the final modulated OFDM signal). Certain terminology throughout the disclosure has referred to the terms "random access channel," "PRACH," and "NR-RACH," etc. These terms are largely used as synonyms. For example, NR-RACH may refer to random access channel functionality associated with embodiments that use NR as the radio access technology.

Although this disclosure has been described in terms of certain embodiments, the above description of the embodiments does not constrain this disclosure. Other changes, substitutions, and alterations are possible without departing from the spirit and scope of this disclosure.

The invention claimed is:

1. A method for use in a network node, the method comprising:
   broadcasting a synchronization signal (SS) to one or more wireless devices, the SS comprising basic information relating to the network node;
   receiving a preamble from one of the wireless devices via a random access channel;
   calculating a reference signal (RS) sequence according to a function, wherein input to the function comprises at least the SS and the preamble received via the random access channel; and
   transmitting a random access response comprising the RS sequence.

2. The method of claim 1, wherein the RS sequence comprises a Zadoff-Chu sequence or a scrambled Zadoff-Chu sequence.

3. The method of claim 1, wherein the random access response comprises a payload, the payload is fully or partially scrambled using a scrambling sequence, and the scrambling sequence depends on the SS, the preamble, or both.

4. The method of claim 1, wherein the RS sequence is determined in part based on additional information that is known by the network node and unknown by the wireless device.

5. The method of claim 1, wherein the SS comprises a primary synchronization signal (PSS) and a secondary synchronization signal (SSS), and wherein the RS sequence is based at least in part on the PSS, the SSS, or both.

6. The method of claim 1, wherein the SS comprises a cell identifier (cell ID), and the RS sequence is based at least in part on the cell ID.

7. The method of claim 1, wherein broadcasting the SS comprises transmitting a physical broadcast channel (PBCH) and the PBCH comprises timing information.

8. The method of claim 1, wherein the random access response is transmitted using a physical downlink control channel (PDCCH) or a physical downlink shared channel (PDSCH) or both.

9. The method of claim 1, wherein the random access response is transmitted using a channel dedicated to random access responses.

10. A method for use in a wireless device, the method comprising:
   receiving a synchronization signal (SS) broadcast from a network node, the SS comprising basic information relating to the network node;
   transmitting a preamble to the network node via a random access channel;
   calculating one or more reference signal (RS) sequences according to a function, wherein input to the function comprises at least the SS and the preamble received via the random access channel; and
   for each of the determined RS sequences, searching for a random access response comprising the RS sequence.

11. The method of claim 10, wherein the RS sequence comprises a Zadoff-Chu sequence or a scrambled Zadoff-Chu sequence.

12. The method of claim 10, wherein the random access response comprises a payload, the payload is fully or partially scrambled using a scrambling sequence, and the scrambling sequence depends on the SS, the preamble, or both.

13. The method of claim 10, wherein the one or more RS sequences are determined in part based on additional information, the additional information obtained from a set of possible values such that each of the one or more RS sequences is determined in part based on a respective value from the set of possible values.

14. The method of claim 10, wherein the SS comprises a primary synchronization signal (PSS) and a secondary synchronization signal (SSS), and wherein the RS sequence is based at least in part on the PSS, the SSS, or both.

15. The method of claim 10, wherein the SS comprises a cell identifier (cell ID), and the RS sequence is based at least in part on the cell ID.

16. The method of claim 10, wherein the SS comprises transmitting a physical broadcast channel (PBCH) and the PBCH comprises timing information.

17. The method of claim 10, wherein the random access response is received via a physical downlink control channel (PDCCH) or a physical downlink shared channel (PDSCH) or both.

18. The method of claim 10, wherein the random access response is received via a channel dedicated to random access responses.

19. A network node, comprising:
   one or more interfaces and processing circuitry, the one or more interfaces configured to:
      broadcast a synchronization signal (SS) to one or more wireless devices, the SS comprising basic information relating to the network node; and
      receive a preamble from one of the wireless devices via a random access channel;
   the processing circuitry configured to:
      calculate a reference signal (RS) sequence according to a function, wherein input to the function comprises at least the SS and the preamble received via the random access channel;
      wherein the one or more interfaces are further configured to transmit a random access response comprising the RS sequence.

20. The network node of claim 19, wherein the RS sequence comprises a Zadoff-Chu sequence or a scrambled Zadoff-Chu sequence.

21. The network node of claim 19, wherein the random access response comprises a payload, the payload is fully or partially scrambled using a scrambling sequence, and the scrambling sequence depends on the SS, the preamble, or both.

22. The network node of claim 19, wherein the RS sequence is determined in part based on additional information that is known by the network node and unknown by the wireless device.

23. The network node of claim 19, wherein the SS comprises a primary synchronization signal (PSS) and a secondary synchronization signal (SSS), and wherein the RS sequence is based at least in part on the PSS, the SSS, or both.

24. The network node of claim 19, wherein the SS comprises a cell identifier (cell ID), and the RS sequence is based at least in part on the cell ID.

25. The network node of claim 19, wherein broadcasting the SS comprises transmitting a physical broadcast channel (PBCH) and the PBCH comprises timing information.

26. The network node of claim 19, wherein the random access response is transmitted using a physical downlink control channel (PDCCH) or a physical downlink shared channel (PDSCH) or both.

27. The network node of claim 19, wherein the random access response is transmitted using a channel dedicated to random access responses.

28. A wireless device, comprising:
   one or more interfaces and processing circuitry, the one or more interfaces configured to:
      receive a synchronization signal (SS) broadcast from a network node, the SS comprising basic information relating to the network node; and
      transmit a preamble to the network node via a random access channel;
   the processing circuitry configured to:
      calculate a reference signal (RS) sequence according to a function, wherein input to the function comprises at least the SS and the preamble received via the random access channel;
   the one or more interfaces further configured to, for each of the determined RS sequences, search for a random access response comprising the RS sequence.

29. The wireless device of claim 28, wherein the RS sequence comprises a Zadoff-Chu sequence or a scrambled Zadoff-Chu sequence.

30. The wireless device of claim 28, wherein the random access response comprises a payload, the payload is fully or partially scrambled using a scrambling sequence, and the scrambling sequence depends on the SS, the preamble, or both.

31. The wireless device of claim 28, wherein the one or more RS sequences are determined in part based on additional information, the additional information obtained from a set of possible values such that each of the one or more RS sequences is determined in part based on a respective value from the set of possible values.

32. The wireless device of claim 28, wherein the SS comprises a primary synchronization signal (PSS) and a secondary synchronization signal (SSS), and wherein the RS sequence is based at least in part on the PSS, the SSS, or both.

33. The wireless device of claim 28, wherein the SS comprises a cell identifier (cell ID), and the RS sequence is based at least in part on the cell ID.

34. The wireless device of claim 28, wherein the SS comprises transmitting a physical broadcast channel (PBCH) and the PBCH comprises timing information.

35. The wireless device of claim 28, wherein the random access response is received via a physical downlink control channel (PDCCH) or a physical downlink shared channel (PDSCH) or both.

36. The wireless device of claim 28, wherein the random access response is received via a channel dedicated to random access responses.

37. A computer program product comprising a non-transitory computer-readable medium storing a computer program, the computer program comprising computer readable instructions for causing processing circuitry to:
   broadcast a synchronization signal (SS) to one or more wireless devices, the SS comprising basic information relating to the network node;
   receive a preamble from one of the wireless devices via a random access channel;
   calculate a reference signal (RS) sequence according to a function, wherein input to the function comprises at least the SS and the preamble received via the random access channel; and
   transmit a random access response comprising the RS sequence.

* * * * *